United States Patent [19]

Wallace

[11] Patent Number: 4,592,468
[45] Date of Patent: Jun. 3, 1986

[54] CUSHIONING CONTAINER

[75] Inventor: Robert S. Wallace, 823 S. Longwood Ave., Los Angeles, Calif. 90005

[73] Assignees: Robert S. Wallace, Los Angeles; Jack Bauman, Pacific Palisades, both of Calif. ; a part interest

[21] Appl. No.: 744,254

[22] Filed: Jun. 13, 1985

[51] Int. Cl.[4] .................... B65D 85/672; B65D 81/02
[52] U.S. Cl. .................... 206/387; 206/523; 220/324
[58] Field of Search ............ 206/387, 523, 591; 220/324

[56] References Cited

U.S. PATENT DOCUMENTS

| D. 213,157 | 1/1969 | Wallace . | |
|---|---|---|---|
| 2,860,768 | 11/1958 | Smithers | 206/523 |
| 3,200,943 | 8/1965 | Waterbury | 206/523 |
| 3,273,779 | 9/1966 | Mykleby | 206/523 |
| 3,495,787 | 2/1970 | Wallace . | |
| 3,584,738 | 6/1971 | Wallace . | |
| 3,604,556 | 9/1971 | Schwartz | 206/387 |
| 3,613,871 | 10/1971 | Evans | 206/387 |
| 3,627,113 | 12/1971 | Di Iola | 206/387 |
| 3,664,492 | 5/1972 | Wallace . | |
| 3,773,272 | 11/1973 | Wallace . | |
| 3,856,235 | 12/1974 | Wallace . | |
| 4,241,829 | 12/1980 | Hardy | 206/328 |
| 4,406,369 | 9/1983 | Wallace . | |

FOREIGN PATENT DOCUMENTS

| 0002416 | 6/1979 | European Pat. Off. | 206/523 |
|---|---|---|---|
| 0086542 | 8/1983 | European Pat. Off. | 206/387 |
| 1310508 | 3/1973 | United Kingdom | 206/523 |

*Primary Examiner*—William Price
*Assistant Examiner*—Jimmy G. Foster
*Attorney, Agent, or Firm*—William W. Haefliger

[57] ABSTRACT

A container comprises a receptacle and a cover therefore, the receptacle having a bottom wall and the cover having a top wall, fins integral with at least one of such walls and projecting toward the other of such walls to engage an article placed within the container and between the walls when the cover is closed onto the receptacle, the fins being yieldably deflectible in response to squeezing of the article between the walls, and fastener structure associated with the receptacle and cover to hold the cover closed on the receptacle with the article squeezed and thereby positioned with the fins in deflected state.

17 Claims, 14 Drawing Figures

U.S. Patent  Jun. 3, 1986  Sheet 2 of 5  4,592,468
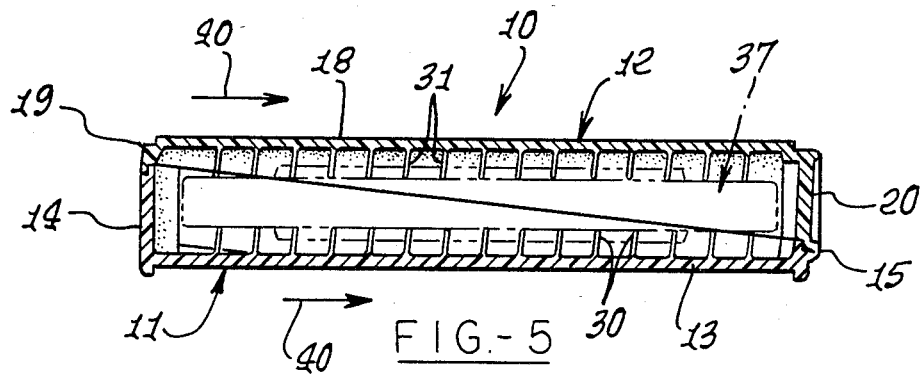
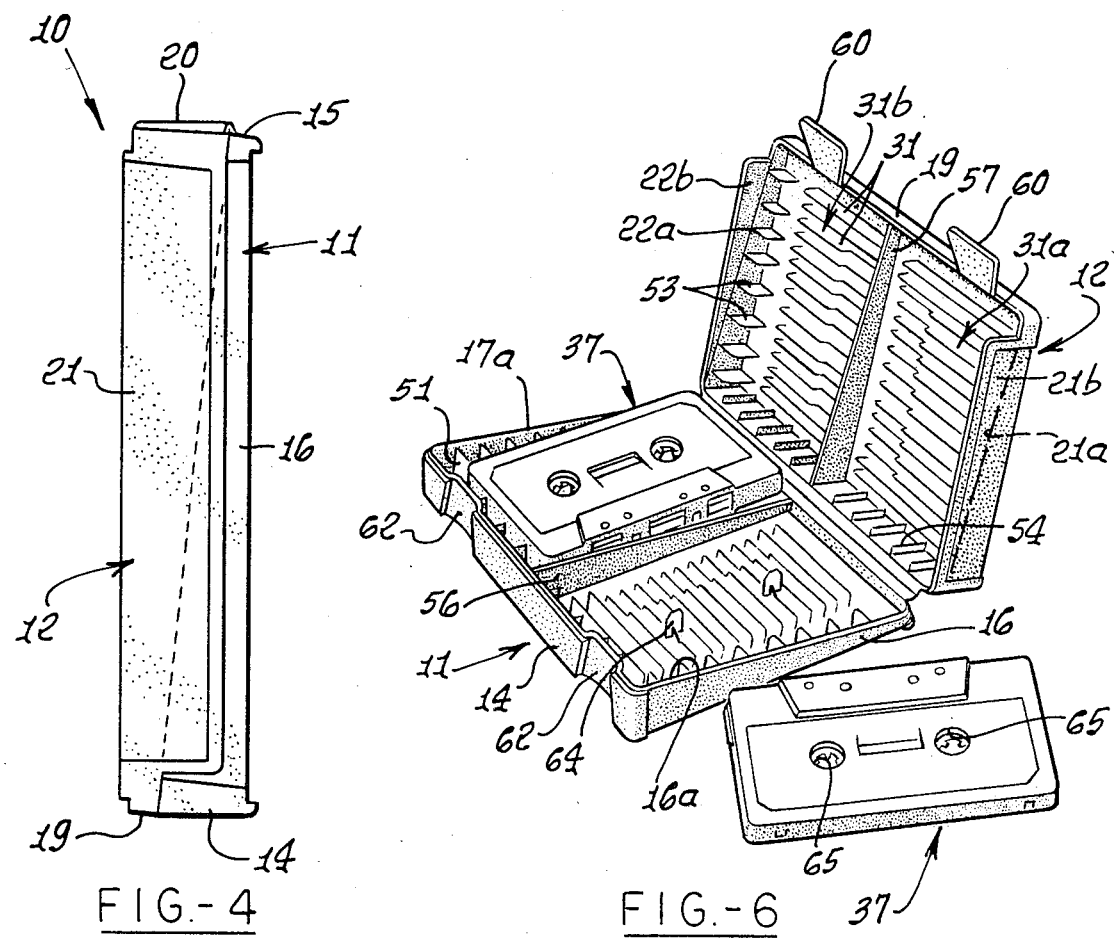

CUSHIONING CONTAINER

BACKGROUND OF THE INVENTION

This invention relates generally to containers which firmly retain articles in position therein; more particularly it concerns a simple, rugged, article positioning container that is easily molded as a one-piece unit.

There is a continuing need for containers for articles requiring stability within the container, and protection against damage due to shock loading, in transport. For example, magnetic tape cassettes require such stability and protection against shock loading. Prior containers have not, however, possessed the unusual advantages in construction, mode of operation and results as now afforded by the present container.

SUMMARY OF THE INVENTION

It is a major object of the invention to provide an improved container meeting the above needs, and characterized by simplicity of construction in a one-piece, molded unit. Basically, the container comprises:

(a) a receptacle and a cover therefor, the receptacle having a bottom wall, and the cover having a top wall, (b) fin means integral with at least one of such walls and projecting toward the other wall to engage an article placed within the container and between the walls when the cover is closed onto the receptacle, (c) the fin means being yieldably deflectible in response to squeezing of the article between such walls, (d) and fastener means associated with the receptacle and cover to hold the cover closed on the receptacle with said article squeezed and thereby positioned with said fin means in deflected state.

As will be seen, the fin means may include fins that extend in generally parallel relation and are spaced apart in series across major extent of said one wall; and the cover typically has depth that gradually diminishes, relative to the fins, in one longitudinal direction, and the receptacle has depth that gradually increases relative to the fins in that longitudinal direction.

Further, the fins typically have terminal edges that define an article positioning plane relative to which said fin planes are out of perpendicularity; and such fins may be grouped to include first fins integral with said one wall, and second fins integral with the other of said walls, with article receiving space formed between the first fins and the second fins, when said cover is closed toward said receptacle. In addition, the first fins may extend in generally parallel relation, spaced apart in series across major extent of said one wall, and the second fins may extend in generally parallel relation, spaced apart in series across major extent of said other wall.

It is a further object to provide the first fins with terminal edges defining a first article positioning plane relative to which the first fins are out of perpendicularity, and to provide the second fins with terminal edges defining a second article positioning plane relative to which the second fins are out of perpendicularity, such first and second planes being substantially parallel, for example. Typically, the first fins extend at angles between 75° and 88° relative to said first plane, and the second fins extend at angles between 75° and 88° relative to the second plane.

It is a further object of the invention to provide such receptacle and cover with hinge connection, the cover, receptacle and hinge connection being a one-piece, molded plastic unit. In this regard, said cover and receptacle may have interconnections at longitudinally spaced sides thereof, one interconnection comprising a molded hinge, and the other interconnection comprising interfitting tongue and groove elements, one on the cover and the other on the receptacle, such elements having wedge interconnection.

As referred to, the article may comprise a magnetic tape cartridge having a side thereof compressively engaged by deflected edges defined by the fin means; the first fins may include two first fin sections, and said second fins may define two second fin sections, there being two articles, one article having sides compressively engaged by deflected fins of a first fin section and a second fin section, and the other article having sides thereof compressively engaged by deflected fins of another first fin section and another second fin section, as will appear. Accordingly, a protective, compact, one-piece container for multiple tape cartridges or other articles, is provided.

These and other objects and advantages of the invention, as well as the details of an illustrative embodiment, will be more fully understood from the following specification and drawings in which:

DRAWING DESCRIPTION

FIG. 4 is an end elevation on lines 4—4 of FIG. 1;

FIG. 5 is a section on lines 5—5 of FIG. 1;

FIG. 6 is a perspective view of the FIG. 1 container, in open condition;

DETAILED DESCRIPTION

Figure 1:
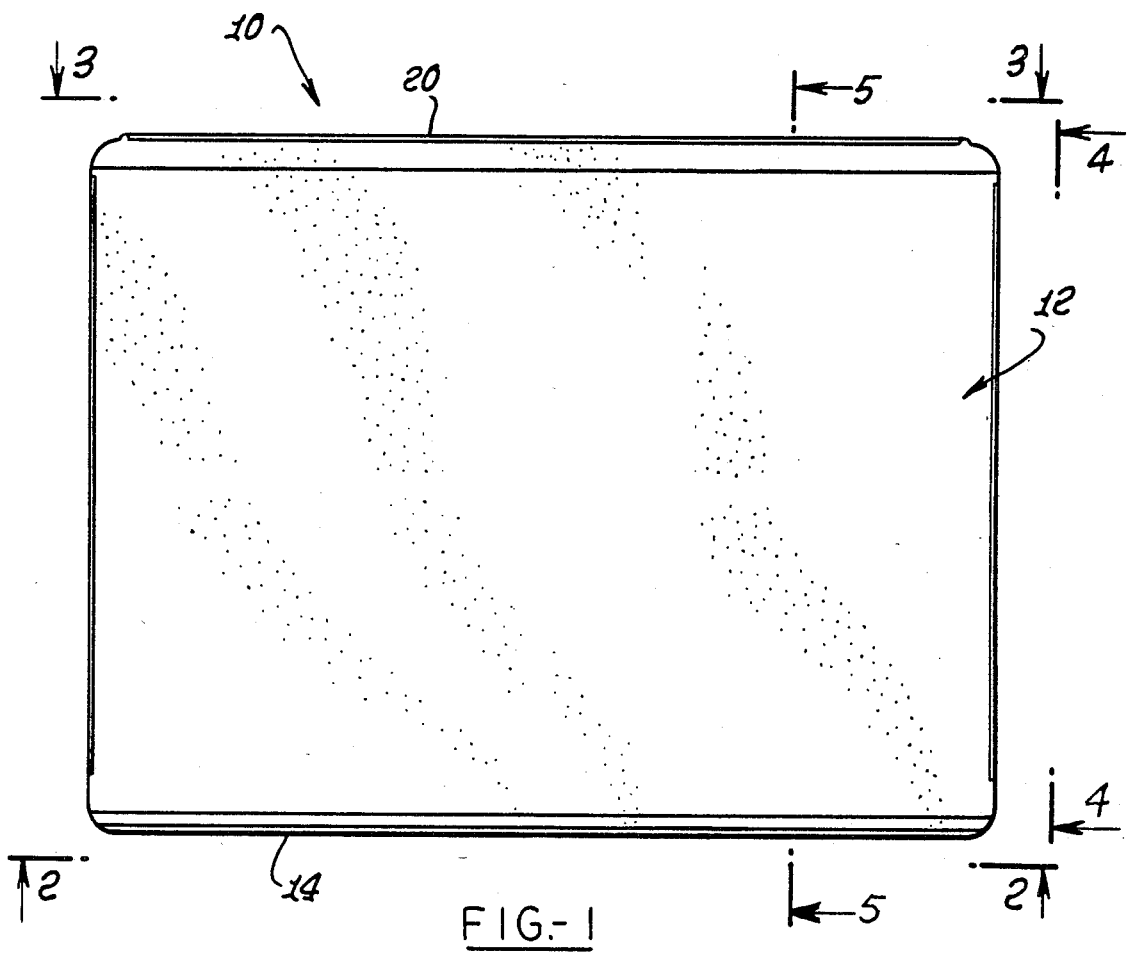
FIG. 1 is a top plan view of a closed container incorporating the invention.
Figure 2:
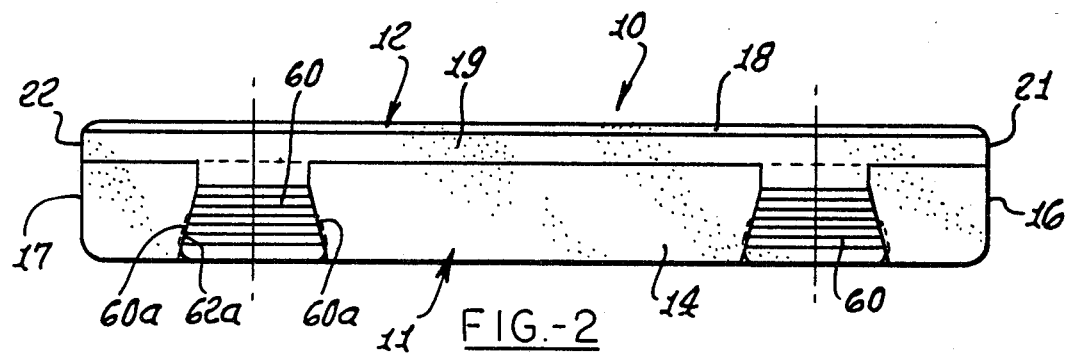
FIG. 2 is a side elevation taken on lines 2—2 of FIG. 1.
Figure 3:
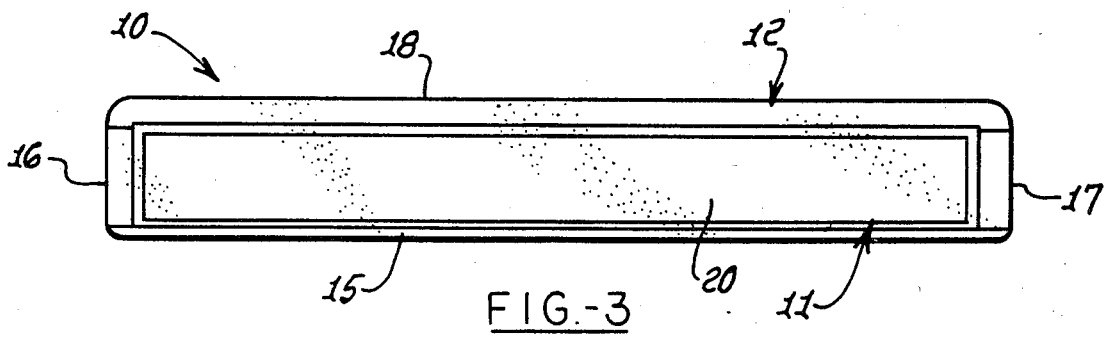
FIG. 3 is a side elevation taken on lines 3—3 of FIG. 1.
Figure 7:
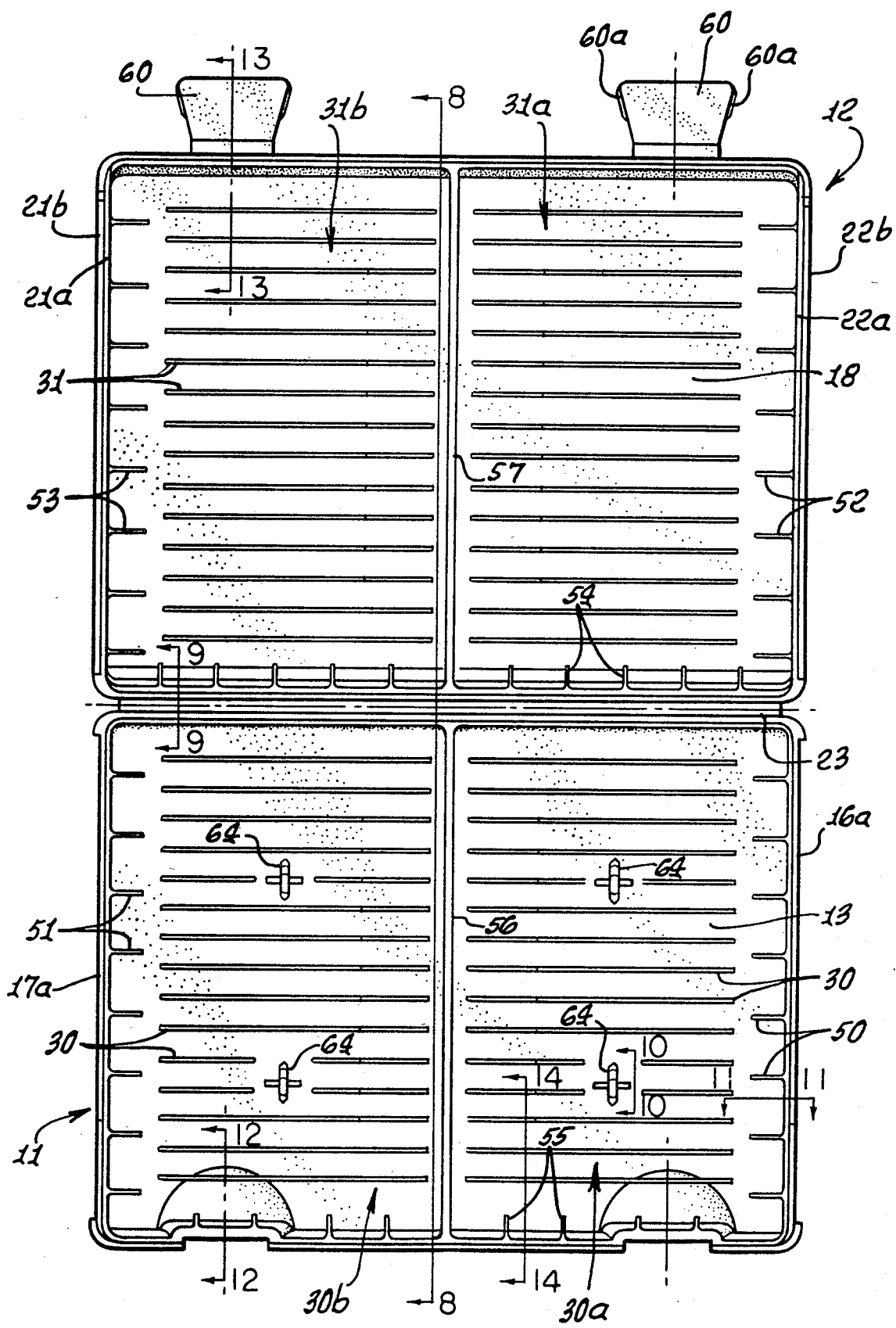
FIG. 7 is a plan view showing the interior of the receptacle and cover of the opened container.
Figure 8:
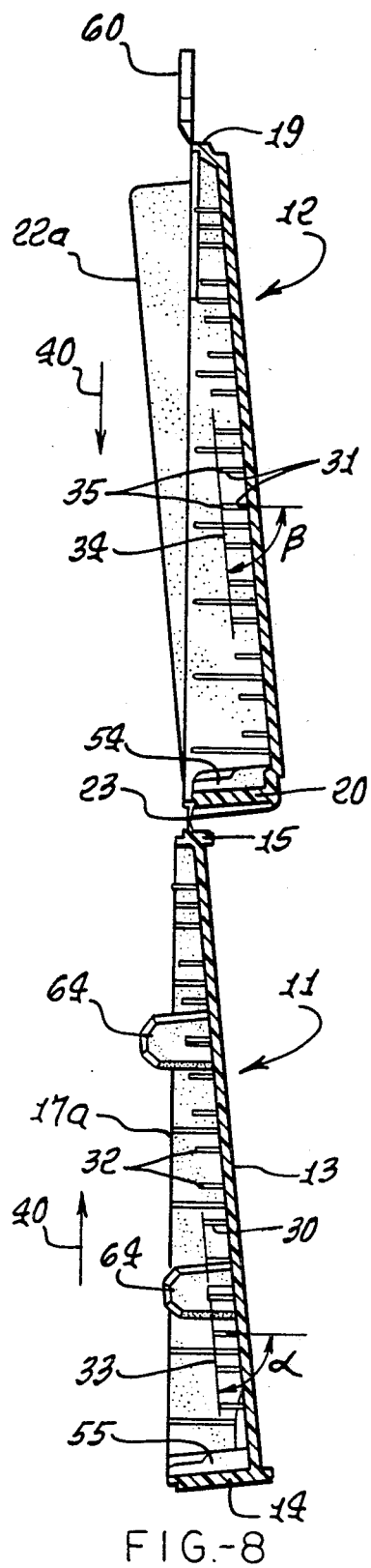
FIG. 8 is a section, in elevation taken on lines 8—8 of FIG. 7.
Figure 9:
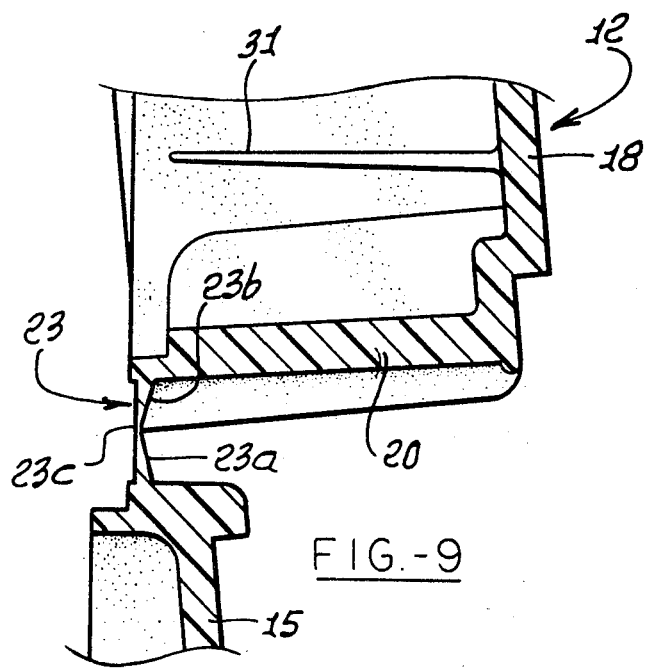
FIG. 9 is an enlarged fragmentary section taken on lines 9—9 of FIG. 7.
Figure 10:
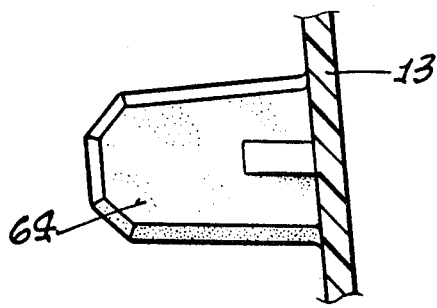
FIG. 10 is an enlarged fragmentary section taken on lines 10—10 of FIG. 7.
Figure 11:
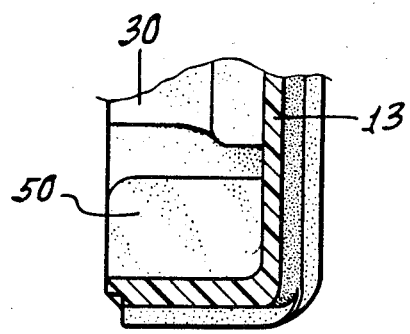
FIG. 11 is an enlarged fragmentary section taken on lines 11—11 of FIG. 7

In the drawings, the container 10 comprises a receptacle 11 and a cover 12 therefor; the receptacle has a bottom wall 13, opposite longitudinally spaced side walls 14 and 15, and opposite laterally spaced end walls 16 and 17; and the cover has a top wall 18, opposite side walls 19 and 20, and opposite end walls 21 and 22. The container and cover are typically have one-piece, molded plastic construction, with integrally molded hinge interconnection at 23. The thin-walled, molded plastic hinge 23 interconnect walls 15 and 20, as is clear from FIGS. 8 and 9, and it has two tapered extents 23a and 23b, with their thinnest extents interconnected at 23c. The hinge is elongated in a lateral direction, parallel to walls 15 and 20.

Figure 12:
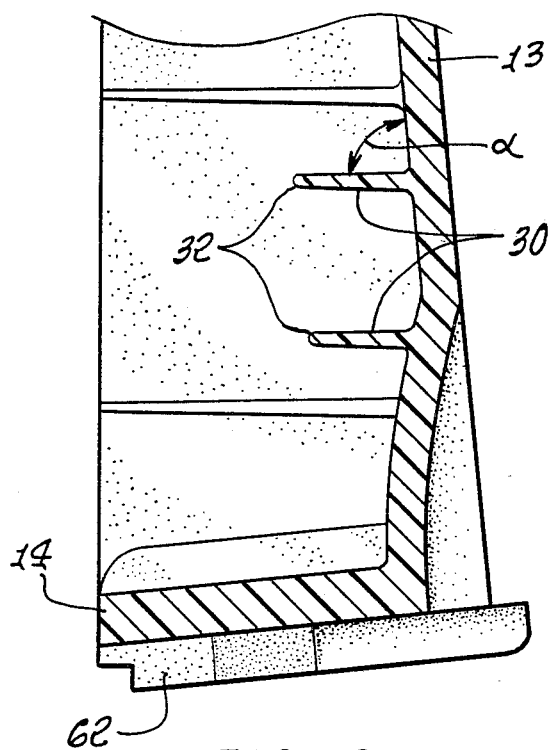
FIG. 12 is an enlarged fragmentary section taken on lines 12—12 of FIG. 7.
Figure 13:
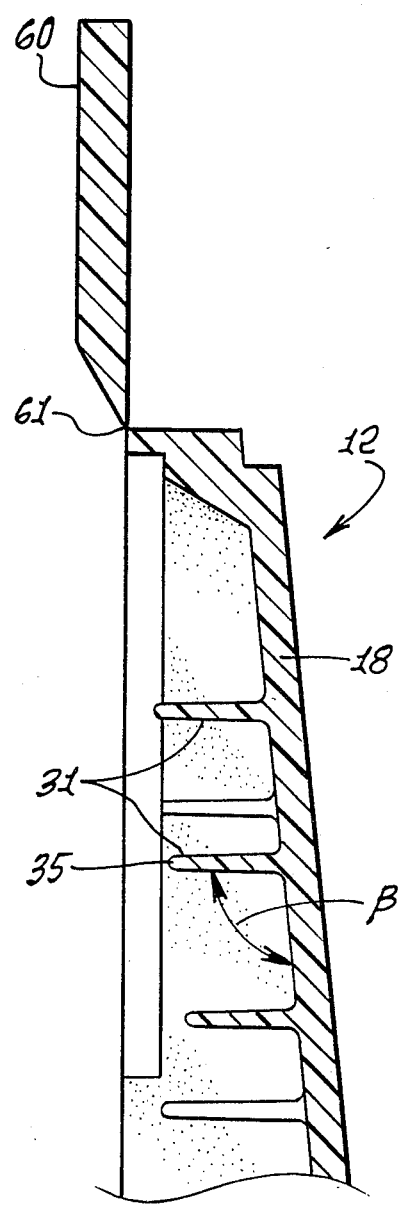
FIG. 13 is an enlarged fragmentary section taken on lines 13—13 of FIG. 7.
Figure 14:
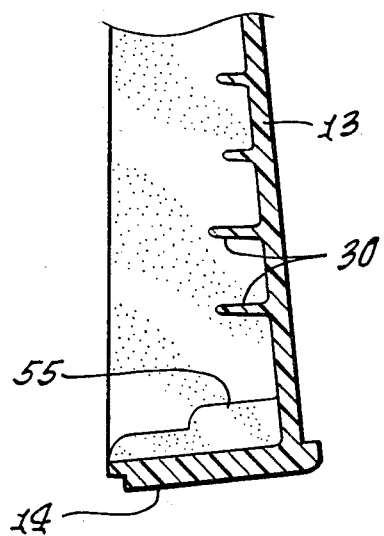
FIG. 14 is an enlarged fragmentary section taken on lines 14—14 of FIG. 7.

Fin means are provided to be integral with at least one of the top and bottom walls 18 and 13, and to project toward the other of such walls to engage an article placed within the container and between the walls when the cover is closed onto the receptacle, the fin means being yieldably deflectible in response to squeezing of the article between the walls. In the example, the fin means include first fins 30, provided in two sections 30a and 30b, integral with one wall, such as receptacle bottom wall 13; and second fins 31, provided in two sections 31a and 31b, integral with the one wall, such as cover top wall 18. The first fins 30 extend in parallel, or substantially parallel, planes, and have terminal edges 32 that define an article positioning plane, or planes 33, relative to which the first fins are slightly out of perpendicularity; thus, the fins extend in lateral, upright parallel planes that extend at an angle α, between 75° and 88° relative to plane 33; and the second fins 31 also extend in lateral, upright, parallel planes that extend at an angle or angles β between 75° nad 88° relative to an article positioning plane 34 defined by their terminal edges 35—i.e. fins 31 are slightly out of perpendicularity relative to plane 34. Such fins typically taper toward their edges, as is clear from FIGS. 12 and 13, to enhance their flexibility, near such edges, which typically engage and position the retained and positioned aretical, as for example a magnetic tape cassette container an example of which is seen at 37 in FIGS. 5 and 6. Note also that the fins extend at correspondingly slight angles α and β relative to the planes of walls 13 and 18, the article 37 extending parallel to those walls (see FIG. 5).

The receptacle, furthermore, has dept that gradually diminishes, relative to its fin height, in one longitudinal direction (see arrow 40 in FIGS. 5 and 8); and the cover has depth that also gradually increases relative to its fin height in that direction 40, in closed condition of the receptacle and cover. This enables the fin arrangement combination, as shown and described, in a highly compact container, with yieldably article cusioning and positioning fins. Note in this regard, the tapering end walls 16 and 17 with tapering edges 16a and 17a, and tapering end walls 21 and 22 with tapering edges 21a and 22a. End walls 21 and 22 also are extended at 21b and 22b to overlap the outer side of the walls 16 and 17, to provide protective closure.

Also provided are flexible auxiliary fins 50 and 51 in the receptacle, and 52 and 53 in the cover, proximate the tapered end walls as described, to position the edges of the article 37, and to slightly (flex) yield if necessary, to cushion the article nested therebetween. See also auxiliary fins 54 and 55 proximate walls 20 and 14, respectively, having similar functions. All of such fins 50-55 project toward edges of the nested and positioned article 37. Dividers 56 and 57 separate the fin sections 30a and 30b, and the sections 31a and 31b, respectively, and maintain separation of side-by side articles 37, as seen in FIG. 6.

Finally, fastener means is associated with the receptacle and cover to hold the cover closed on the receptacles with the article squeezed by the fins, and thereby positioned with the fin means in deflected state. The fastener means advantageously may comprise interfitting tongue and groove elements, one on the cover and the other on the receptacle. See for example, the integral flat plastic tongue 60 having integral, folding hinge connections at 61 to the cover wall (see FIG. 13), and the grooves 62 defined by and in receptacle wall 14. The tongues and grooves are shown to have interfitting wedge shape, to retain the cover closed on the receptacle, yet allow ready pull-out of the tongues or tabs, from closed, flush positions, when the cover is to be opened. See tapered edges 60a of the tongue, and tapered walls 62a of the grooves. Upstanding projections 64 integral with the receptacle wall 13 interfit the cassette reel hubs 65, to block rotation of the hubs, preventing loosening of the magnetic tape.

I claim:

1. A container, comprising
   (a) a receptacle and a cover therefore, the receptacle having a bottom wall and the cover having a top wall,
   (b) fin means integral with at least one of said walls and projecting toward the other of said walls to engage an article placed within the container and between said walls when the cover is closed onto the receptacle,
   (c) said fin means being yieldably deflectible in response to squeezing of the article between said walls,
   (d) and fastener means associated with the receptacle and cover to hold the cover closed on the receptacle with said article squeezed and thereby positioned with said fin means in deflected state,
   (e) said fin means comprising fins extending in generally parallel planes and having terminal edges that define an article positioning plane relatively to which said fin planes are out of perpendicularlity.

2. The container of claim 1 wherein said fin means are spaced apart in series across major extent of said one wall.

3. The container of claim 1 wherein said fins extend in generally parallel relation, laterally, said cover having depth that gradually diminishes, relative to the fins, in one longitudinal direction, and said receptacle having depth that gradually increases relative to the fins in said one longitudinal direction.

4. The container of claim 1 wherein said fin means include first fins integral with said one wall, and second fins integral with the other of said walls, there being article receiving space formed between said first fins and said second fins, when said cover is closed toward said receptacle.

5. The container of claim 4 wherein said first fins extend in generally parallel relation and are spaced apart in series across major extent of said one wall, and said second fins extend in generally parallel relation and are spaced apart in series across major extent of said other wall.

6. The container of claim 4 wherein said first fins are generally parallel, laterally, and said second fins are generally parallel, laterally, said cover having depth that gradually diminishes, relative to the fins integral with the cover, in one longitudinal direction, and said receptacle having depth that gradually increases, relative to the fins carried by the receptacle, in said longitudinal direction.

7. The container of claim 4 wherein said first fins have terminal edges defining a first article positioning plane relative to which said first fins are out of perpendicularity, and said second fins have terminal edges defining a second article positioning plane relative to which said second fins are out of perpendicularity.

8. The container of claim 7 wherein said first and second planes are substantially parallel.

9. The container of claim 7 wherein said first fins extend at angles between 75° and 88° relative to said first plane, and said second fins extend at angles between 75° and 88° relative to said second plane.

10. The container of claim 4 wherein said first fins includes two first fin sections, and said second fins define two second fin sections, there being two of said articles, one article having sides compressively engaged by deflected fins of a first fin section and a second fin section, and the other article having sides thereof compressively engaged by deflected fins of another first fin section and another second fin section.

11. The container of claim 10 wherein said articles comprise magnetic tape cartridges.

12. The combination of claim 11 including projections integral with one of said walls to interfit cartridge reel hubs, and block rotation thereof.

13. The combination of claim 4 including auxiliary fins integral with peripheral walls defined by the cover and receptacle, to edge wise position the article in the container.

14. The container of one of claims 1 and 4 wherein said receptacle and cover have hinge connection, the cover, receptacle and hinge connection being a one-piece, molded plastic unit.

15. The container of one of claims 1 and 4 wherein said article comprises a magnetic cartridge having a side thereof compressively engaged by deflected edges defined by the fin means.

16. The container of claim 1 wherein said fin means extend laterally, and said cover and receptacle have interconnections at longitudinally spaced sides thereof, one interconnection comprising a molded hinge, and the other interconnection comprising interfitting tongue and groove elements, one on the cover and the other on the receptacle.

17. The container of claim 16 wherein said tongue and groove elements are defined by molded plastic material, and have interlocking wedge shape.

* * * * *